Dec. 5, 1967  R. ECKHARDT  3,356,003
UNIVERSAL VIEW FINDER FOR CAMERA ADAPTED TO
RECEIVE INTERCHANGEABLE LENSES
Filed Oct. 18, 1965  2 Sheets-Sheet 1

INVENTOR
ROBERT ECKHARDT
BY Spencer & Kaye
ATTORNEYS

Dec. 5, 1967  R. ECKHARDT  3,356,003
UNIVERSAL VIEW FINDER FOR CAMERA ADAPTED TO
RECEIVE INTERCHANGEABLE LENSES
Filed Oct. 18, 1965  2 Sheets-Sheet 2
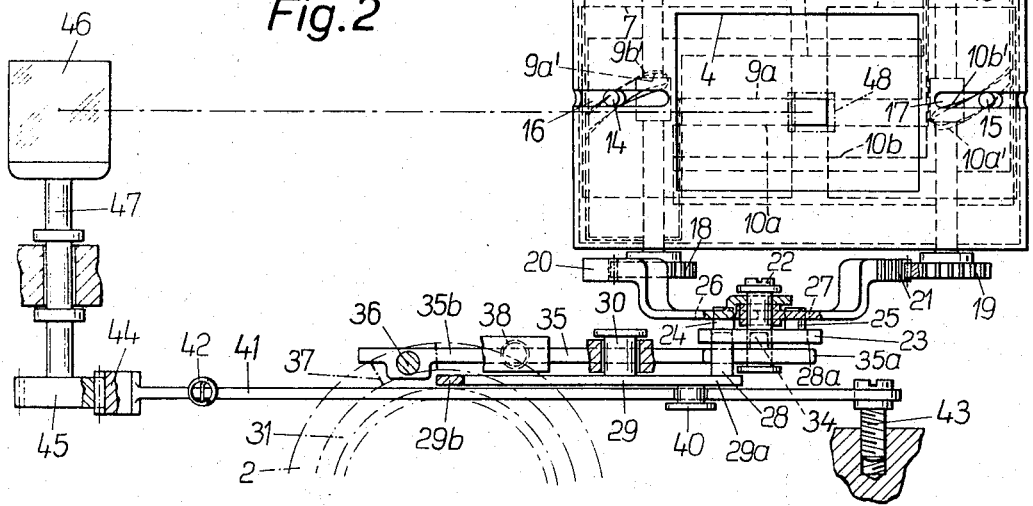
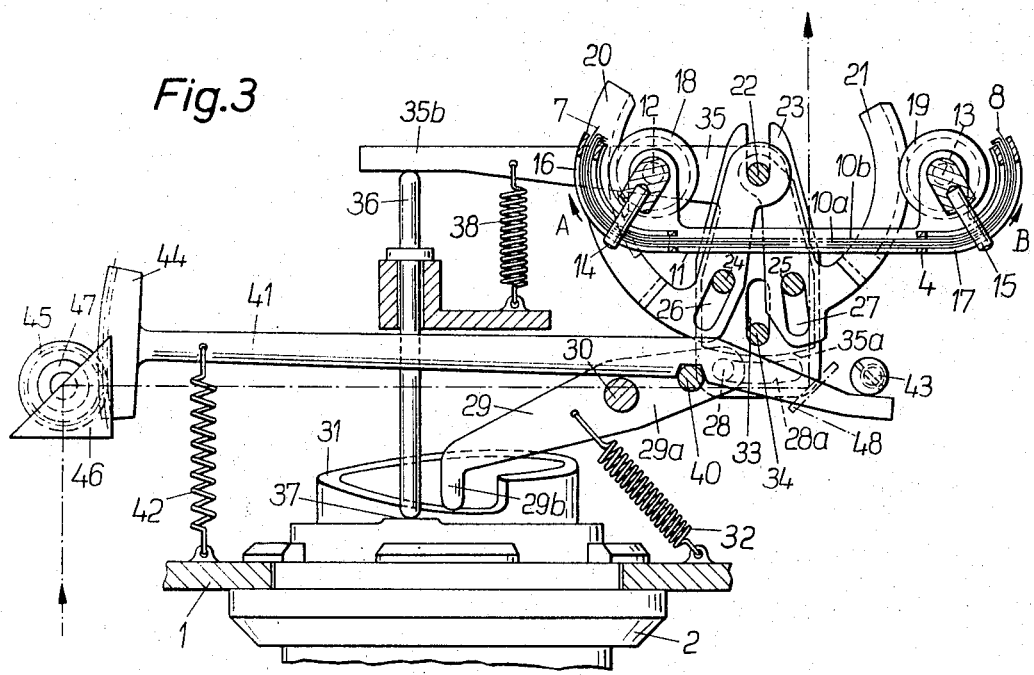
INVENTOR
ROBERT ECKHARDT
BY Spencer & Kaye
ATTORNEYS

United States Patent Office 3,356,003
Patented Dec. 5, 1967

3,356,003
UNIVERSAL VIEW FINDER FOR CAMERA ADAPTED TO RECEIVE INTERCHANGEABLE LENSES
Robert Eckhardt, Leun, Kreis Wetzlar, Germany, assignor to Ernst Leitz G.m.b.H., Wetzlar, Germany
Filed Oct. 18, 1965, Ser. No. 497,345
Claims priority, application Germany, Feb. 15, 1965, L 49,963
3 Claims. (Cl. 95—44)

The present invention relates generally to the camera art, and, more particularly, to a universal direct view finder or eye-level view finder which is built into a photographic camera which itself is adapted to receive interchangeable lenses.

In order to make it possible, in cameras of the above type, to compensate for parallax as a function of the distance or range to which the camera is set, a field of view diaphragm arranged in an intermediate picture plane of the view finder, is generally displaced along the connecting line between the view finder axis and the lens axis.

It is also known automatically to compensate for shrinkage of the picture or image area.

In order to accomplish this, it has up to now been customary to use field of view diaphragms or even luminous frames in which a horizontal edge is fixedly connected with a vertical edge. Each set of two edges thus formed a fixed angle, preferably a right angle, and in order to compensate for parallax, it was sufficient if both angles, while maintaining a fixed relative position with respect to each other, were shifted such that the center point of the frame formed by them was shifted along the above-mentioned connecting line between the picture taking lens and the view finder lens. However, in order to compensate for the image field a field of view shrinkage, the relative position of the two angles with respect to each other has to be varied simultaneously, and this has to be done in such a manner that the apexes of the angles are moved along the diagonals which connect them. These two components of movement are superimposed upon each other to form a resultant which is controlled in dependency on the range to which the device is set.

Here it is important that, due to the diagonal shifting, the view finder diaphragm is expediently made of a flat planar material which in the course of this shifting is moved in its own plane. In this way, the width and height require relatively large physical dimensions for the camera. This is particularly so if what is involved is a universal view finder in a camera equipped for interchangeable lenses whose image frame, or the angles forming the same, must be displaced not only to compensate for parallax and image field shrinkage but also for making visible image fields of different size.

In such view finders, the displacement of the angles between lenses having a long focal length (telephoto lenses) and lenses having a short focal length (wide angle lenses) is so large that an appreciable amount of space has to be kept free laterally, in the plane of the field of view diaphragm, in order that there be enough room for the angles to be displaced sufficiently.

With this in mind, it is a main object of the present invention to provide an arrangement that overcomes the above drawbacks.

Another object of the invention is to provide a device of the type described wherein adjustment of the view finder field of view of diaphragm in accordance with the focal length of the particular lens used is independent of the adjustment thereof which accompanies focussing, and vice versa.

A further object is to provide a device which adjusts the view finder field of view as required and yet which needs but relatively little space in the camera body.

Still another object is to provide a device for properly adjusting the field of view of the view finder in an accurate and relatively simple manner.

These and other objects ancillary thereto are accomplished in accordance with preferred embodiments of the invention wherein each edge of the diaphragm is constituted by a separate field of view diaphragm blade each of which is movable individually and only at right angles to the direction in which the edge extends. In this way, one or more blades can be rolled up at that part thereof which is opposite to the edge forming the field of view diaphragm.

Additional objects and advantages of the present invention will become apparent upon consideration of the following description when taken in conjunction with the accompanying drawings in which:

FIGURE 2 is a schematic front view of the universal view finder, on an enlarged scale.

FIGURE 3 is a plan view of the structure shown in FIGURE 2.

Figure 1:
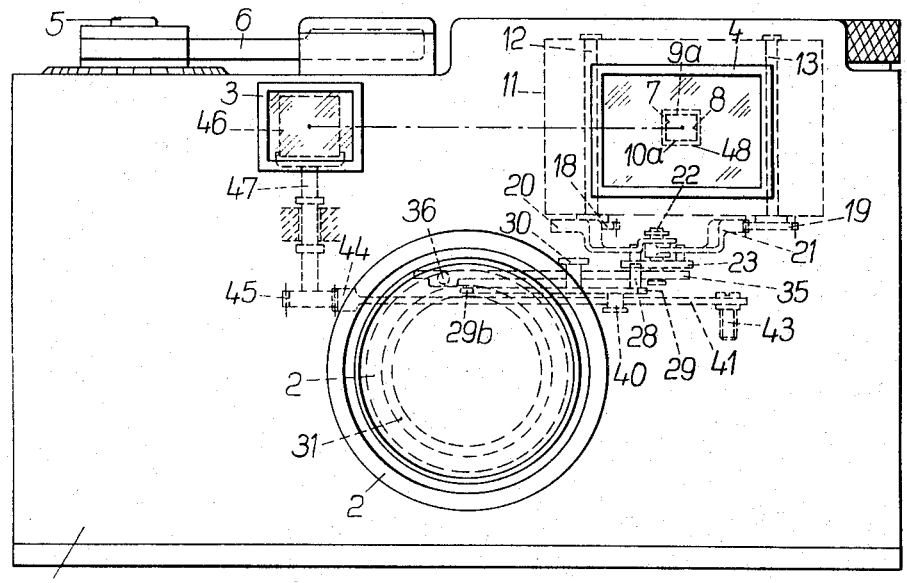
FIGURE 1 is a front view of camera equipped with a universal view finder according to the present invention.

Referring now to the drawings and first to FIGURE 1 thereof, the same shows a camera 1 carrying an interchangeable lens 2. The camera has a viewing window 3 for the range finder beam and a window 4 for the view finder. Arranged at the upper side of the camera is the shutter release button 5 and the partly covered advance lever 6 for the film transport and shutter cocking mechanism.

Figure 4:
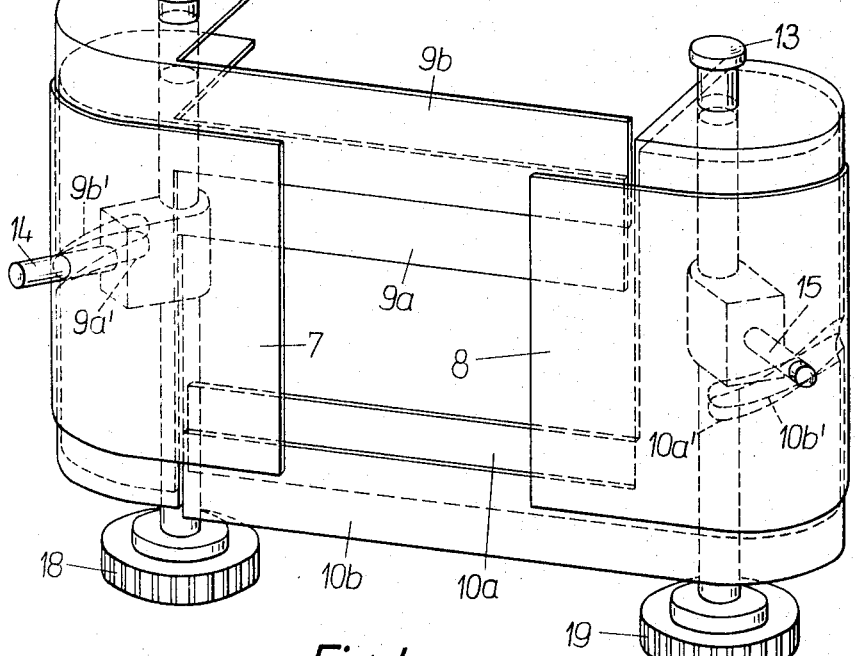
FIGURE 4 is a perspective view of the blades and the axles.

The field of view diaphragm is arranged in an intermediate plane of the view finder, the vertical edges of the diaphragm being formed by the sheets 7 and 8, see FIGURES 2 and 4. In order to save space, the field of view is limited horizontally by two sheets 9a, 9b as well as 10a, 10b, each of which can also constitute two effective image edges. The sheets 9a, 9b, 10a and 10b slide telescopically one behind the other whenever the field of view diaphragm is adjusted, as will be explained below.

The relatively thin field of view diaphragm sheets are guided in a guide arm 11, see FIGURES 2 and 3, which is formed cylindrically at two sides, see FIGURE 3, and which has at its horizontal sides inner guide grooves for the sheets 7 and 8. The sheets are guided in these guide grooves in the direction of the arrows A, B shown in FIGURE 3, while the sheets 9a, 9b, 10a, 10b are shifted at right angles to the plane of the drawing of FIGURE 3, these sheets being guided by the cylindrical surfaces. The sheets are moved and controlled by means of the following mechanism.

Two rotatable axles 12 and 13 are arranged concentrically with the two cylinder surfaces of the frame 11. Each of these axles carries, approximately in its middle, a pin 14 and 15 extending in radial direction and fixedly connected with the axles, the free ends of these pins sliding in horizontal slits 16 and 17. Each of these pins penetrates, firstly, one of the two horizontally displaceable sheets 7 and 8. The arrangement is such that when these axles are rotated, the sheets are displaced in the direction of arrows A, B, and the edges which are directed away from the edges forming the diaphragm wind up cylindrically.

Secondly, the pin 14 extends through curved or rounded grooves 9a′, 9b′ of the sheets 9a and 9b and the pin 15 extends through curved grooves 10a′, 10b′ of the sheets 10a, 10b. Inasmuch as these grooves have a suitable pitch, see FIGURES 2 and 4, the sheets 9a, 9b, 10a and 10b are simultaneously moved at right angles to the plane of FIGURE 3 when the axles are rotated. The rectilinear guiding for this movement is given to the sheets by the cylindrical shape of their ends.

The axles 12 and 13 are rotated by means of a gear drive. The axle 12 carries at its lower end, as viewed in FIGURES 2 and 4, the gear 18 and the axle 13 carries the gear 19. Each of these gears is fixedly secured to its respective axle. The gear 18 is in mesh with a gear segment 20 while the gear 19 is in mesh with the gear segment 21, see FIGURE 3. A pivot 22 serves as a common pivot point for both of these segments.

The gear segments 20 and 21 are drivable in two different ways in order to allow the field of view diaphragm to be adjusted. First, for the correction of parallax and image field fading upon focussing of the lens between infinity and the nearest focussing point, and secondly for adapting the view finder diaphragm to the focal lengths or viewing angles, of the interchangeable lenses. In order to adjust the view finder diaphragm for the proper focal length, the two segments are pivoted in the same direction, while in order to correct for parallax and image field shrinkage they are pivoted in the opposite direction.

Both segments are mounted on a plate 23 which is both pivotal and also slidable about the pivot 22. The plate 23 carries two pins 24 and 25 which are fixedly connected to the plate. The pin 24 engages in elongated slot 26 of the gear segment 20 while the pin 25 extends into a corresponding elongated slot 27 of the gear segment 21. The two elongated slots are oblique with respect to the direction in which the plate 23 is slidable so that when the plate 23 is slid, the segments 20 and 21 are rotated. Since, however, the angles which the elongated slots form with the direction in which the plate 23 is slid are not the same, the two segments and hence the two axles will be rotated through different angles. It is thus possible, by properly arranging the elongated slots, to displace the vertical diaphragm edges through different distances.

The same possibility is available insofar as the horizontal diaphragm edges are concerned. Here, to be sure, it will be the grooves 9a', 9b', 10a', 10b' which are given different pitches, so that these sheets, and hence the diaphragm edges which they form, too can be displaced differently with respect to each other.

The plate 23 also has an elongated slot 28a which runs transverse to the direction in which the plate 23 is slid. A pin 28 extends into elongated slot 28a, and the pin is fixedly mounted on a lever arm 29a of a two-armed lever 29. The latter is pivotable about a pivot 30 and the other lever arm 29b bears against an axially curved cam surface 31 of the lens 2. As is conventional, the cam surface 31 is carried on a mounting part which is rotatable and axially displaceable when the lens is focussed for proper distance. Also provided is a spring 32 which tends to hold the lever arm 29b in engagement with the curved cam surface.

For the second type of displacement, i.e., for enabling the view finder diaphragm to be adjusted to the particular angle of the lens, the plate 23 is provided with an elongated slot 33 that extends precisely in the direction in which the plate 23 is displaceable. A pin 34 extends into this elongated slot 33, and this pin is fixedly connected to one arm 35a of a two-armed lever 35. The lever 35 is a bell crank lever which is rotatable about the pivot 22 and whose upper arm 35b is functionally connected with the control cam 37 of the lens 2 by means of a pin 36. A spring 38 is provided for bringing these parts into contact with each other. In this way, the second type of adjustment, too, is controlled by the lens 2.

The above-mentioned lever 29 additionally has a pin 40. A lever 41 bears against this pin 40 under the influence of a spring 42. The lever 41 bears against a lug 43 and carries at its opposite end a gear segment 44. The latter is an engagement with a pinion 45 which is connected for rotation together with a prism 46 via a shaft 47. The prism 46 serves to direct the measuring rays of the range finder onto the partly light-permeable mirror 48 which, for purposes of combining the range finder and view finder beams, is arranged in a further intermediate image plane of the look-through view finder.

The above-described arrangement operates as follows:

When the lens 2 is mounted on the camera, the control cam 37 whose position is fixed with respect to the lens, comes to engage the pin 36, thereby to bring the lever 35 into a position which matches the focal length of the lens that is placed onto the camera.

When the lever 35 is pivoted, the plate 23 is also pivoted via the pin 34 and the elongated slot 33. The pins 24 and 25 of the plate 23, which pins are arranged in the elongated slots 26, 27, pivot segments 20, 21 in the same direction. Since, however, the gear segment 20 has an internal gear which is in mesh with the gear 18 while the gear segment 21 has an external gear which is in mesh with the gear 19, the axles 12 and 13 are rotated in opposite directions. It is this opposite rotation which is necessary to make the view finder field of view diaphragm larger or smaller, depending on the particular image field.

In the course of the above operation, the plate 23 is connected with the lever 29 via the elongated slot 28a of the pin 28.

Since, however, the elongated slot 28a extends in an arc about the pivot 22, this coupling does not interfere with the pivotal movement.

When the lens 2 is placed on the camera, what also happens is that the arm 29b of the lever 29 comes to engage the axially curved cam 31 of the lens 2. In FIGURE 3, the arc 29b is shown in one of its end positions. Accordingly, the plate 23 with its elongated slot will be in one end position against the pin 34. This position is the position in which the lens is focussed to the nearest point. If the lens is focussed to a different range somewhere between the nearest point and infinity, the curved cam 31 is rotated, as a result of which the lever 29 is pivoted in clockwise direction. The pin 28 thereby slides the plate 23 downwardly, as viewed in FIGURE 3, so that the pins 24 and 25, and the segments 20 and 21, respectively, are moved against each other. This movement results in a rotation of the axles 12 and 13 in counterclockwise direction so that, for example, the sheets 7 and 8 forming the vertical edges are moved to the right when the parts are in the position shown in FIGURE 3. At the same time, the sheets 9a, 9b, 10a, 10b, forming the horizontal edges slide, with all of the sheets sliding more or less upwardly. This corresponds to the requisite compensation for the parallax and image field fading when the lens is focussed toward infinity.

Two of the horizontal sheets 9a, 9b, 10a, 10b are provided for each side. By suitably selecting the curved grooves 9a', 9b', 10a', 10b', this splitting up into two makes it possible to slide two blades in a telescope manner one behind the other or to pull them out in such manner. This reduces, to a substantial extent, the amount of space required for shifting the sheets in vertical direction.

When a lens with a different focal length is put on the camera, the control cam 37 of such lenses 2 will have a different height, for example a greater height. As a result, the pin 36 is pressed back further and this, in turn, pivots the bell crank lever 35 in clockwise direction. In FIGURE 3, there is shown the lens 2 having the greatest focal length. Consequently, the pin 28 will be at one corner of the elongated slot 28a. Clockwise pivoting of the bell crank lever 35 corresponds to pivoting of the plate 23 in the same direction, so that the pin 28 will then be more or less in the middle of this elongated slot.

As explained above, the adjustment of the view finder diaphragm in accordance with the focal length of the lens is not influenced by the adjustability in dependence on the focussing, and conversely, the focussing is not hindered by the fact that the field of view diaphragm can be set as a function of the focal length. The two adjustments can be carried out one after the other, without there being any effect on one or the other.

It will thus be seen that in accordance with the present invention there is provided a rotatable axle which is directly next to and parallel to at least one of the edges of the view finder diaphragm, onto which axle the adjacent diaphragm sheet is wound up. Even if but one such axle is used, a substantial amount of space is saved on that side on which the axle is provided. As explained above, however, there are preferably two axles, the two being parallel to two opposite edges of the diaphragm. The sheets which form these edges will have their rear parts wound up on the respective axles so that the amount of space which is saved in one direction, for example, in horizontal direction, is twice as great as when but one rotatable axle is used.

It will also be seen from the above that, in accordance with the present invention, the sheets which form the field of view diaphragm edges that are at right angles to the above-described sheets that are wound up on the axles are moved at right angles to their edges by means of the control mechanism described. In order to save space in vertical direction as well, the sheets are subdivided into at least two sheets which, when they are slid at right angles to the edges of the field of view diaphragm, overlap telescopically. Each individual sheet is displaced by the axles by means of the above-described mechanism.

It will also be seen from the above that the axles themselves are rotated by drives which are subjected to two independent driving means. The first of these driving means is derived from the movement that occurs when an interchangeable lens is put on the camera, while the second drive is actuated by the range adjustment of the particular lens that has been put on the camera.

It will be understood that the above description of the present invention is susceptible to various modifications, changes, and adaptations, and the same are intended to be comprehended within the meaning and range of equivalents of the appended claims.

What is claimed is:
1. A universal view finder device for use with a camera adapted for interchangeable lenses, said view finder comprising, in combination:
 view finder field of view diaphragm means including at least four separate diaphragm sheets having effective edges which define right angles and a field of view between them, said diaphragm sheets each having an effective edge which aids in defining the field of view and which is movable individually but only at a right angle to its effective edge for adapting the field of view to lenses of different focal lengths as well as for parallax correction and image field shrinking;
 two rotatable axle means respectively arranged directly next to and parallel to two opposite effective edges, the sheets providing said two opposite edges being windable onto the adjacent rotatable means;
 means for mounting the sheets providing the other edges which extend at right angles to said axle means for movement at right angles to the direction in which their edges extend in dependence upon rotation of said axle means, each of said sheets which provide the effective edges disposed at right angles to said axle means being subdivided into at least two sheets mounted for telescopically overlapping movements, and driving means connected between each of said subdivided sheets and said axle means for moving said subdivided sheets.

2. A universal view finder device for use with a camera adapted for interchangeable lenses, said view finder comprising, in combination:
 view finder field of view diaphragm means including at least four separate diaphragm sheets having effective edges which define right angles and a field of view between them, said diaphragm sheets each having an effective edge which aids in defining the field of view and which is movable individually but only at a right angle to its effective edge for adapting the field of view to lenses of different focal lengths as well as for parallax correction and image field shrinking;
 two rotatable axle means respectively arranged directly next to and parallel to two opposite effective edges, the sheets providing said two opposite edges being windable onto the adjacent rotatable means;
 means for mounting the sheets providing the other edges which extend at right angles to said axle means for movement at right angles to the direction in which their edges extend in dependence upon rotation of said axle means;
 first control means for actuation in dependence upon the particular focal length of the lens connected to such camera;
 second control means for actuation in dependence upon the range setting of the particular lens connected to such camera; and
 means interconnected between said axle means for being actuated by both said first and said second control means and controlling the position and size of the field of view in accordance therewith.

3. A device as defined in claim 2 wherein said interconnected means is controlled by said first control means independently of said second control means and vice versa.

References Cited
UNITED STATES PATENTS

| | | | |
|---|---|---|---|
| 1,991,924 | 2/1935 | Dolan | 95—36 |
| 2,186,610 | 1/1940 | Leavitt | 95—36 |
| 2,917,968 | 12/1959 | Nojiri | 95—44 X |

JOHN M. HORAN, *Primary Examiner.*